Jan. 13, 1925.
L. G. GREGORY
1,522,879
KNOB ATTACHMENT FOR STEERING WHEELS
Filed July 23, 1924
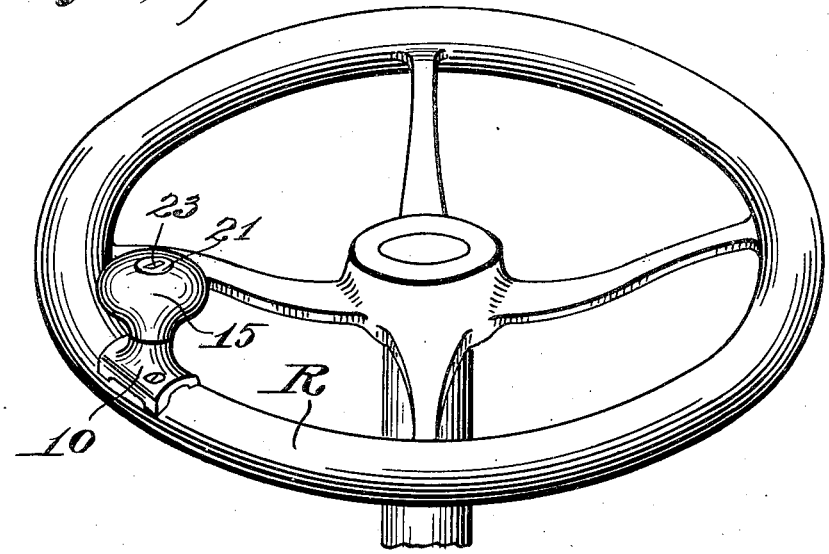
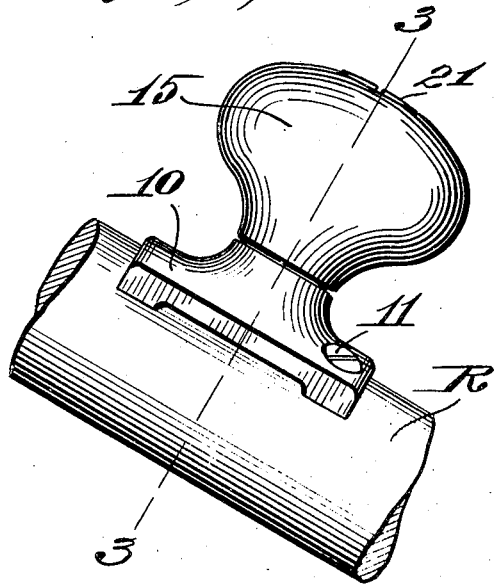
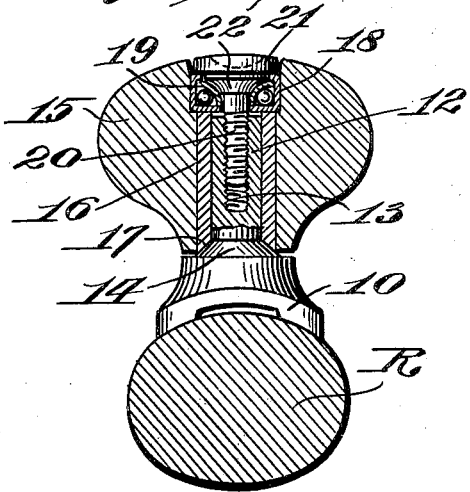
INVENTOR,
Leonard G. Gregory,
By Martin P. Smith, atty.

Patented Jan. 13, 1925.

1,522,879

UNITED STATES PATENT OFFICE.

LEONARD G. GREGORY, OF LOS ANGELES, CALIFORNIA, ASSIGNOR TO WM. GREGORY CO., OF LOS ANGELES, CALIFORNIA, A COPARTNERSHIP.

KNOB ATTACHMENT FOR STEERING WHEELS.

Application filed July 23, 1924. Serial No. 727,676.

*To all whom it may concern:*

Be it known that I, LEONARD G. GREGORY, a citizen of the United States, residing at Los Angeles, in the county of Los Angeles and State of California, have invented certain new and useful Improvements in Knob Attachments for Steering Wheels, of which the following is a specification.

My invention relates generally to the steering wheels of motor vehicles, and more particularly to an attachment in the nature of a knob or handle that is adapted to be secured to the rim portion of a steering wheel and which knob or handle may be readily and comfortably engaged or gripped by the operator's hand, consequently enabling the steering wheel to be operated to greater advantage and with less effort than where the hand is directly applied to the rim of the steering wheel.

Further objects of my invention are to provide a steering wheel knob or handle that may be readily applied to or removed from the rims of steering wheels of motor vehicles, to form the knob or handle so that it may be comfortably gripped by the operator's hand, to provide the knob attachment with means for taking up any wear and for preventing rattling while the vehicle with which the device is associated is in operation, to provide a steering wheel knob attachment that will not engage or catch upon the clothing of the operator while the steering wheel is being manipulated or while the operator is entering or leaving the car, and, further, to provide a device of the character described that is relatively simple, strong and durable in structure and which may be easily and cheaply produced.

With the foregoing and other objects in view, my invention consists in the features of construction and combination and arrangement of parts hereinafter more fully described and claimed, reference being had to the accompanying drawings, in which—

Figure 1 is a perspective view of a motor vehicle steering wheel having a knob attachment of my improved construction applied thereto;

Figure 2 is an elevational view of the knob attachment in position upon the steering wheel;

Figure 3 is a cross section taken on the line 3—3 of Figure 2.

Referring by numerals to the accompanying drawings, which illustrate a practical embodiment of my invention, 10 designates a plate, preferably formed of metal, having its under surface made concave in cross section in order that it may be fitted onto the upper curved surface of the rim R of a steering wheel. Any suitable attaching means may be used for securing the plate 10 to the steering wheel rim, although as illustrated I prefer to use fastening means which has screws 11 that pass through suitably located apertures in the end portions of plate 10 and which enter the body of rim R.

Formed integral with and projecting upwardly from the central portion of plate 10 is a post or pin 12 in the upper portion of which is formed an axially disposed threaded bore 13, and formed between the lower portion of said post and the top of plate 10 is a conical shoulder or bearing surface 14. The knob or handle 15 forming part of my invention is preferably formed of hard rubber, compressed fibre, bakelite, or analogous material, and the body of said knob is preferably shaped somewhat similar to an ordinary door knob and of a size that will fit readily within the hand.

Passing through the center of the body of the knob and rigidly fixed therein is a sleeve 16, preferably of metal, that receives the post or standard 12, and the lower end of this sleeve 16 is countersunk and beveled, as designated by 17, so as to fit on the conical shoulder or bearing 14. Formed in the upper portion of the body of the knob 15 and directly above the upper end of sleeve 16 is a circular recess 18 in which is arranged an annular anti-friction bearing 19, preferably of the type utilizing small hard metal balls. Passing through this annular anti-friction bearing 19 and entering threaded bore 13 is the threaded shank 20 of a screw having a head 21 that occupies the upper portion of recess 18, and formed on the under side of the screw head 21 is a conical shoulder 22 that normally bears on the rotating portion of the housing of anti-friction bearing 19. This screw is effective in retaining the knob 15 on the post or standard 12, and whenever necessary said screw may be tightened to take up any wear that may occur between the lower end of sleeve 16 and the shoulder 14 and likewise any wear that may occur in the anti-friction bearing 19.

Knob 15 rotates freely upon the post or standard 12 and when said knob is gripped by the hand it is a comparatively easy matter to rotate the steering wheel in either direction.

The knob attachment may be positioned at any desired point on top of the steering wheel rim R, but, for convenience and to obtain best results, I prefer to locate said knob on the left hand portion of the steering wheel when the latter is set or positioned so that the machine is being driven directly forward. When so positioned, the knob may be conveniently engaged by the left hand of the driver, and when so engaged the steering wheel may be readily rotated in either direction with comparatively little effort and without engaging or catching on the clothing of the operator.

To facilitate manipulation of the screw that retains the knob on the post or standard a recess or slot such as 23 is formed in the upper surface of the head of said screw. If desired, suitable means may be provided for locking the screw to the post or standard 12, which locking means must necessarily be released when the screw is adjusted to take up wear or tighten the anti-friction bearing. By thus locking the screw to the post or standard, said screw will not be rotated as a result of the rotary motion of the knob upon the post or standard.

A steering wheel knob attachment of my improved construction is comparatively simple, may be easily and cheaply produced, is positioned on the rim of the steering wheel so that it does not interfere with the operation of the latter or with the movements of the operator while entering or leaving the vehicle, and said knob greatly facilitates the manipulation of the steering wheel, particularly when the vehicle is being manipulated or driven backward or forward within a comparatively small area.

It will be readily understood that various minor changes in the form, size and construction of my improved steering wheel knob attachment may be made without departing from the spirit of my invention, the scope of which is set forth in the appended claims.

I claim as my invention:

1. A knob attachment for steering wheels comprising a base plate adapted to be secured to a steering wheel rim, a post projecting upwardly from said base plate, a knob mounted for rotation on said post, and means arranged between said knob and post for taking up wear between said parts and preventing rattling of the knob upon said post.

2. A knob attachment for vehicle steering wheels comprising a plate adapted to be attached to the rim of a steering wheel, a post projecting upwardly from said plate, a knob rotatively arranged on said post, means for retaining the knob on said post, and an anti-friction bearing arranged between said retaining means and said knob.

3. A knob attachment for vehicle steering wheels comprising a plate adapted to be secured to the rim of a steering wheel, a post projecting upwardly from said plate, a conical shoulder between said post and plate, a knob mounted for rotation upon said post, and an inclined annular bearing on the lower end of said knob which is adapted to engage said conical shoulder.

4. A knob attachment for vehicle steering wheels, comprising a plate adapted to be secured to the rim of the steering wheel, a post projecting upwardly from said plate, a knob mounted for rotation upon said post, and means for taking up wear between said post and knob and for preventing rattling of the knob upon said post.

5. A knob attachment for vehicle steering wheels comprising a plate adapted to be applied to a steering wheel rim, a post projecting upwardly from said plate, a knob mounted for rotation on said post and provided in its upper portion with a recess, an anti-friction bearing arranged within said recess, and means adapted to engage said post and said anti-friction bearing for retaining the knob on said post.

In testimony whereof I affix my signature.

LEONARD G. GREGORY.